(12) United States Patent
Thomas

(10) Patent No.: US 7,681,913 B2
(45) Date of Patent: Mar. 23, 2010

(54) AIR BAG SYSTEM

(75) Inventor: Scott D. Thomas, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 362 days.

(21) Appl. No.: 11/411,629

(22) Filed: Apr. 26, 2006

(65) Prior Publication Data
US 2007/0252370 A1 Nov. 1, 2007

(51) Int. Cl.
*B60R 21/239* (2006.01)
*B60R 21/276* (2006.01)

(52) U.S. Cl. .................. 280/736; 280/739; 280/743.2

(58) Field of Classification Search ........... 280/736, 280/739–742, 743.1, 743.2; *B60R 21/239, B60R 21/276*
See application file for complete search history.

(56) References Cited

U.S. PATENT DOCUMENTS

| | | | | |
|---|---|---|---|---|
| 6,039,346 A * | 3/2000 | Ryan et al. | ........... | 280/736 |
| 6,390,501 B1 * | 5/2002 | Greib et al. | ........... | 280/743.2 |
| 6,409,213 B2 * | 6/2002 | Webber et al. | ........... | 280/739 |
| 6,422,597 B1 * | 7/2002 | Pinsenschaum et al. | ........... | 280/735 |
| 6,454,300 B1 * | 9/2002 | Dunkle et al. | ........... | 280/742 |
| 6,513,835 B2 * | 2/2003 | Thomas | ........... | 280/743.2 |
| 6,616,184 B2 * | 9/2003 | Fischer | ........... | 280/743.2 |
| 6,669,231 B2 * | 12/2003 | Ryan | ........... | 280/736 |
| 6,746,045 B2 * | 6/2004 | Short et al. | ........... | 280/736 |
| 6,799,777 B2 * | 10/2004 | Hawthorn et al. | ........... | 280/742 |
| 6,832,778 B2 * | 12/2004 | Pinsenschaum et al. | ........... | 280/739 |
| 6,932,385 B2 * | 8/2005 | Hawthorn et al. | ........... | 280/739 |
| 7,490,854 B2 * | 2/2009 | Thomas | ........... | 280/739 |
| 7,510,212 B2 * | 3/2009 | Green et al. | ........... | 280/743.2 |
| 2001/0035637 A1 * | 11/2001 | Thomas et al. | ........... | 280/736 |
| 2002/0135166 A1 * | 9/2002 | Thomas | ........... | 280/735 |
| 2003/0155756 A1 * | 8/2003 | Hawthorn et al. | ........... | 280/739 |
| 2004/0012180 A1 * | 1/2004 | Hawthorn et al. | ........... | 280/739 |
| 2004/0051282 A1 * | 3/2004 | Okamoto et al. | ........... | 280/732 |
| 2004/0051285 A1 * | 3/2004 | Fischer | ........... | 280/739 |
| 2004/0051286 A1 * | 3/2004 | Fischer et al. | ........... | 280/739 |
| 2004/0094941 A1 * | 5/2004 | Waid et al. | ........... | 280/736 |
| 2004/0232675 A1 * | 11/2004 | Marotzke | ........... | 280/739 |
| 2004/0232677 A1 * | 11/2004 | Fischer et al. | ........... | 280/739 |
| 2005/0057027 A1 * | 3/2005 | Fogle et al. | ........... | 280/739 |
| 2005/0104347 A1 * | 5/2005 | Hawthorn et al. | ........... | 280/739 |
| 2005/0127648 A1 * | 6/2005 | Fischer et al. | ........... | 280/739 |
| 2005/0146122 A1 * | 7/2005 | Gould et al. | ........... | 280/739 |
| 2005/0248137 A1 * | 11/2005 | Delventhal et al. | ........... | 280/739 |
| 2006/0290117 A1 * | 12/2006 | Fischer et al. | ........... | 280/739 |
| 2006/0290118 A1 * | 12/2006 | Thomas | ........... | 280/739 |

* cited by examiner

*Primary Examiner*—Paul N Dickson
*Assistant Examiner*—Laura Freedman
(74) *Attorney, Agent, or Firm*—Quinn Law Group, PLLC.

(57) ABSTRACT

An air bag system includes an inflator operable to release inflation fluid, a cushion inflatable upon release of inflation fluid, and an air bag housing having a vent substantially surrounding the cushion. A first plate includes a first portion defining a first opening and a second portion defining a second opening. The first plate is movable from a first position, wherein the first opening is aligned with the vent, to a second position, wherein the second opening is aligned with the vent. A second plate including a first portion defining a first opening and a second portion defining a second opening may also be provided. The second plate is preferably movable from a first position, wherein the first opening is aligned with the vent, to a second position, wherein the second opening is aligned with the vent. The first and second plates preferably interact to define four distinct vent areas.

17 Claims, 3 Drawing Sheets

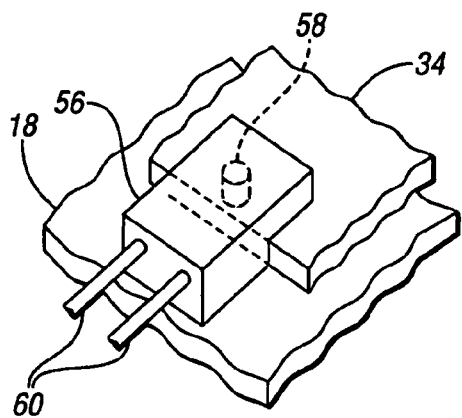
FIG. 7
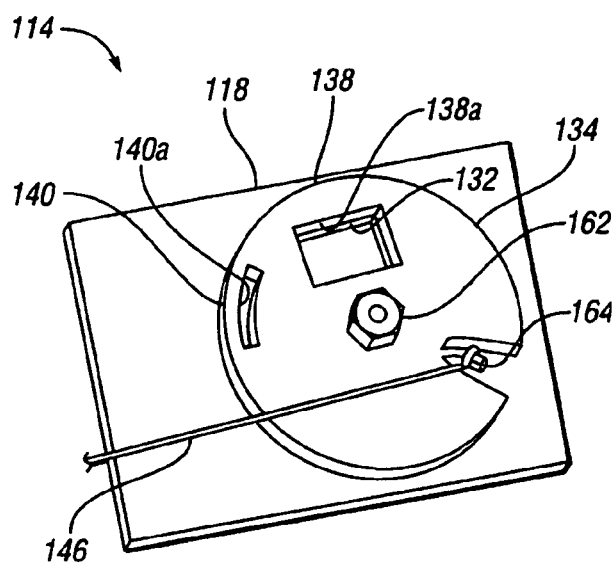
FIG. 8
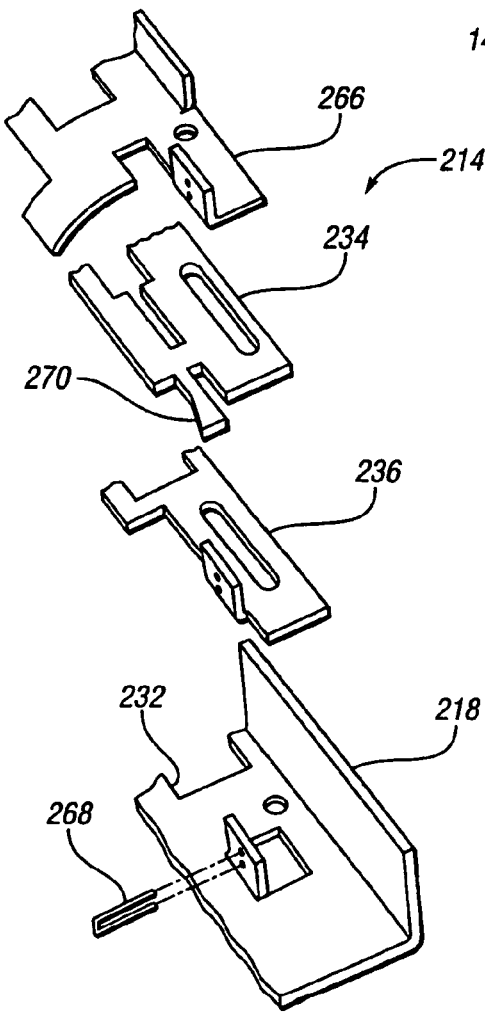
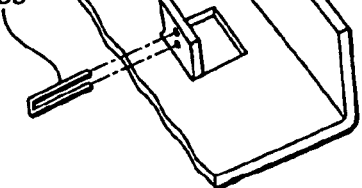
FIG. 9B
FIG. 9A

AIR BAG SYSTEM

TECHNICAL FIELD

This invention relates to an automotive vehicle air bag system, and more particularly to a movable member for assisting in controlling deployment of an air bag.

BACKGROUND OF THE INVENTION

Air bag systems in automotive vehicles generally include an air bag that is designed to deploy within a passenger compartment of the automotive vehicle when triggered by a sensor signal. For example, air bag systems might be deployed upon sudden deceleration of a vehicle or upon impact of the vehicle with another object. The art continues to investigate alternative ways to deploy air bags. For example, accelerometers have been investigated to determine when a sensor signal should signal the deployment of an air bag. Inflator assemblies have been developed to control how much gas is emitted into an air bag upon deployment.

SUMMARY OF THE INVENTION

An air bag system includes an inflator operable to release inflation fluid, an inflatable cushion inflatable upon release of inflation fluid from the inflator, and an air bag housing substantially surrounding the cushion. The housing includes a vent for venting inflation fluid. A first plate includes a first portion defining at least a first opening and a second portion defining at least a second opening. The first plate is movable from a first position, wherein the first opening is aligned with the vent, to a second position, wherein the second opening is aligned with the vent. Movement of the first plate may occur by translation or rotation, or in any other manner.

In one aspect of the invention, the first opening is larger than the second opening, such that the first plate blocks more of the vent when in the second position than when in the first position. In another aspect of the invention, the air bag system further includes a tether operable to move the first plate from the first position to the second position. The tether may extend between the first plate and the cushion, such that inflation of the cushion beyond a predetermined distance moves the first plate from the first position to the second position. The air bag system may also include a switch changeable from a first state to a second state, with movement of the first plate from the first position to the second position moving the switch between the states.

In still another aspect of the invention, the air bag system further includes a second plate having a first portion defining at least a first opening and a second portion defining at least a second opening. The second plate is preferably movable from a first position, wherein the first opening is aligned with the vent, to a second position, wherein the second opening is aligned with the vent. Preferably, the first plate moves from the first position to the second position in a first direction, while the second plate moves from the first position to the second position in a second direction substantially opposite of the first direction. The first and second plates preferably interact to define four distinct vent areas.

A retention member may engage the first and/or second plates to initially prevent movement thereof. Movement of the first plate from the first position to the second position may disengage the retention member, thereby allowing movement of the second plate only after movement of the first plate.

The air bag system may further include a movable member at least partially defining a pressurizable chamber, with an actuator operable to selectively release actuation fluid into the pressurizable chamber to move the movable member from an undeployed state to a deployed state. Preferably, the movable member attaches to the second plate, such that movement of the movable member from the undeployed state to the deployed state moves the second plate from the first position to the second position.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 7 is a schematic perspective view of a sensor for use with the air bag system of FIG. 2A;

FIG. 8 is a schematic perspective view of a portion of a second embodiment of an air bag system according to the present invention;

FIG. 9A is a schematic perspective view of a portion of a third embodiment of an air bag system according to the present invention; and FIG. 9B is an exploded view of the portion of the air bag system shown in FIG. 9A.

DESCRIPTION OF THE PREFERRED EMBODIMENTS

Figure 1:
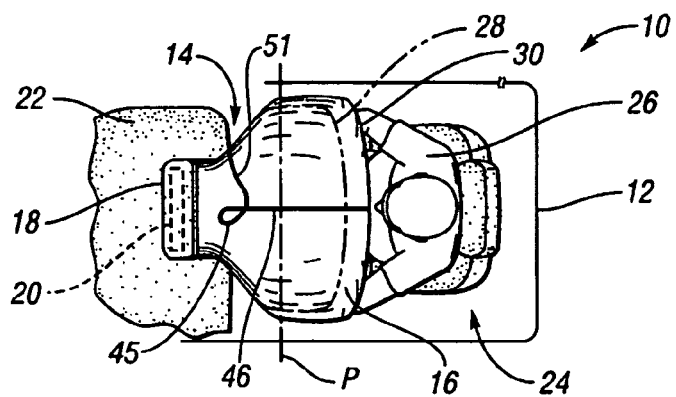
FIG. 1 is a schematic plan view of an air bag system mounted to a vehicle.

Referring to the drawings, wherein like reference numbers refer to like components, FIG. 1 shows a vehicle 10 having a vehicle body 12. An air bag system 14 is mounted to the vehicle 10. The air bag system 14 includes an inflatable cushion 16 connected to an air bag housing 18. An inflator 20 is mounted within the housing 18. The housing 18 is mounted within an instrument panel 22, although it may be mounted elsewhere on the vehicle 10 within the scope of the invention.

The cushion 16 is selectively deployable into an interior space 24 toward an occupant 26 upon release of inflation gas by the inflator 20. The cushion 16 may be inflatable when deployed to either a shallow first profile 28 or a deeper second profile 30 as known in the art. Sensors (not shown) mounted to the vehicle 10 may be connected in signaling communication with the inflator 20, as known to those skilled in the art. Under certain sensed conditions, the sensors signal the inflator 20 to release inflation fluid, thereby inflating the cushion 16.

A line, denoted as P in FIG. 1, represents a predetermined distance, the purpose of which will become more apparent below. The predetermined distance P may be chosen anywhere within the vehicle interior space 24 between the air bag housing 18 and the first profile 28. For ease of explanation, each reference to "the predetermined distance P of FIG. 1" and "the predetermined distance P" used herein refer to the schematically represented predetermined distance P of FIG. 1.

Figure 2A:
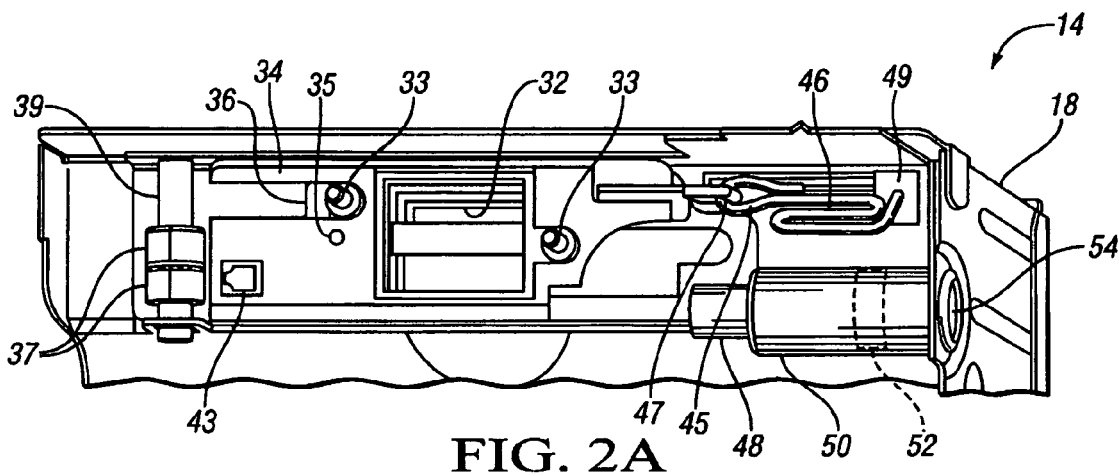
FIG. 2A is a schematic perspective view of a portion of the air bag system of FIG. 1.

Referring now to FIG. 2A, a portion of the air bag system 14 is shown. The housing 18 defines a vent 32 oriented such that inflation fluid released from the inflator 20 of FIG. 1 may pass therethrough to the surrounding atmosphere, thereby affecting the inflation and deflation (i.e., ride-down) of the cushion 16 of FIG. 1. Atop the housing 18 are a first plate 34 and a second plate 36. The first plate 34 is shown in more detail in FIG. 2B, while the second plate 36 is shown in more detail in FIG. 2C. Preferably, the first plate 34 and second plate 36 are sandwiched between the housing 18 and an external plate (not shown) that is attached via fasteners 33.

Figure 2B:
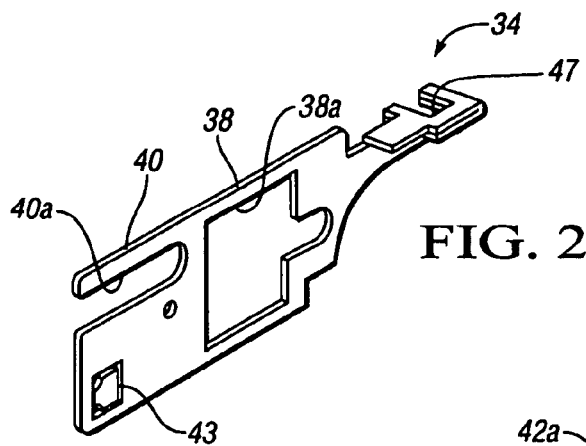
FIG. 2B is a schematic perspective view of a first plate of the air bag system of FIG. 2A.

As shown in FIG. 2B, the first plate 34 defines a first portion 38 and a second portion 40. The first plate 34 is movable from a first position, wherein the first portion 38 is substantially aligned with the vent 32, to a second position, wherein the second portion 40 is substantially aligned with the vent 32. The first portion 38 defines an opening 38a configured such that it is approximately the same size as the vent 32. Thus, when the first plate 34 is in the first position, the vent 32 remains substantially unblocked thereby. The second portion 40 similarly defines an opening 40a, with the opening 40a in the second portion 40 configured such that the first plate 34 blocks at least a portion of the vent 32 when in the second position. It should be noted that the opening 40a in the second portion 40 could be configured to have zero area; that is, the second portion 40 can effectively have no opening without affecting operation of the present invention.

Figure 2C:
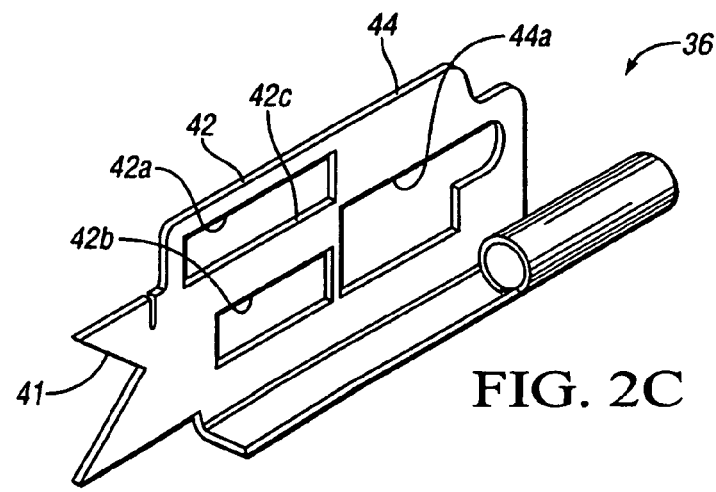
FIG. 2C is a schematic perspective view of a second plate of the air bag system of FIG. 2A.

Turning now to FIG. 2C, the second plate 36 also defines a first portion 42 and a second portion 44. The second plate 36 is also movable from a first position, wherein the first portion 42 is substantially aligned with the vent 32, to a second position, wherein the second portion 44 is substantially aligned with the vent 32. In this embodiment, the first portion 42 defines two openings 42a, 42b on either side of a separator 42c. When the second plate 36 is in the first position, the vent 32 is blocked by the separator 42c, while fluid can flow through the vent 32 and out of the openings 42a, 42b. The second portion 44 defines an opening 44a configured such that only the lower half of the vent 32 remains unblocked when the second plate 36 is in the second position. It should be noted that the openings 38a, 40a, 42a, 42b, 44a within the portions 38, 40, 42, 44 of each plate 34, 36 can be configured in many different ways within the scope of the present invention. It matters only that each plate 34, 36 be movable from a first position to a second position to change the area of the vent 32. Additionally, while the term "plate" is used herein, it should be appreciated that the invention contemplates any member movable from a first position to a second position to change an effective venting area.

Referring back to FIG. 2A, a tether 46 attaches to the first plate 34, with a distal end of the tether 46 routing through the air bag housing 18 and attaching to the cushion 16 of FIG. 1, preferably to an inner face thereof. In the preferred embodiment, the tether 46 attaches directly to the inner face; however, the tether 46 could also be indirectly attached to the cushion 16 without changing the inventive concept. Prior to inflation of the cushion 16, the tether 46 is substantially slack, as shown in FIG. 2A. As the cushion 16 inflates, the tether 46 is pulled taut. The tether 46 has a length such that the tether 46 is fully taut when the cushion 16 reaches the predetermined distance P of FIG. 1. If the cushion 16 passes the predetermined distance P, the tether 46 pulls the first plate 34, preferably in a first direction A (shown in FIGS. 3A through 6B), from the first position to the second position. If the cushion 16 does not pass the predetermined distance P, the tether 46 will not pull the first plate 34 into the second position. Thus, the predetermined distance P is defined as the distance that the cushion 16 must move and that the portion of the tether 46 attached thereto must extend past during inflation in order for movement of the first plate 34 to occur.

The tether 46 is preferably detachably attached to either the first plate 34 or the cushion 16 of FIG. 1. Preferably, after the tether 46 moves the first plate 34 from the first position to the second position, the proximal end 45 of the tether 46 detaches from the first plate 34 or from the cushion 16. If the tether 46 does not detach, the tether 46 will pull on the cushion 16 since it is restrained between the first plate 34 and the cushion 16, and thus affect the inflation profile. To prevent this from occurring, the present invention provides a detachably attached tether 46. For example, the proximal end 45 of the tether 46 can pull out of the slot 47 in the first plate 34 once the first plate 34 has been pulled to the second position and the slot 47 aligns with hole 49 in the housing 18. As shown in FIG. 1, the tether 46 can be anchored with an anchor strap 51 to another portion of the air bag system 14 or cushion 16 so that the released proximal end 45 of the tether 46 moves inside the cushion 16 in a controlled manner. In addition, or as an alternative, the tether 46 may include a stitched loop which can rip open, thereby extending the effective length of the tether 46 once the cushion 16 passes the predetermined distance P.

As also shown in FIG. 2A, the air bag system 14 includes a movable member 48 attached to the second plate 36 and slidable within a housing 50 from an undeployed state (shown in FIGS. 3A through 4B) to a deployed state (shown in FIGS. 5A through 6B). The piston housing 50 and at least a portion of the movable member 48 define a pressurizable chamber 52. An actuator 54 extends into the pressurizable chamber 52, and releases actuation fluid thereinto upon detection of certain sensed conditions. One such actuator 54 is a pyrotechnic device, such as a container of solid propellant, wherein the propellant is conventionally ignited by an electrical signal, such as a signal from a sensor, to actuate the actuator 54. Upon actuation, pressure builds within the pressurizable chamber 52 to move the movable member 48 from the undeployed state to the deployed state. The conditions causing the actuator 54 to actuate may include impact speed, weight, size, or electric field of the occupant, sensed seat or occupant position, detected seatbelt status, etc. Each of these conditions may be determined with sensors in signaling communication with the actuator 54. Since the movable member 48 is attached to the second plate 36, movement of the movable member 48 from the undeployed state to the deployed state moves the second plate 36 from the first position to the second position, preferably in a second direction B (shown in FIGS. 3A through 6B) substantially opposite the first direction A.

As shown in FIG. 2A, a set of restraining tethers 37 operable to control inflation of the cushion 16 include loops securable around a rod 39. When the restraining tethers 37 are secured around the rod 39, the cushion 16 is inflatable to the shallow first profile 28 shown in FIG. 1. If the restraining tethers 37 detach from the rod 39 during operation of the present invention, the cushion 16 is inflatable to the deep second profile 30 of FIG. 1. The present invention can operate to release the restraining tethers 37, thereby allowing inflation of the cushion 16 to the deep profile 30. Particularly, the second plate 36 can include a cutting blade 41, as shown in FIG. 2C. As the second plate 36 moves to the second position, the cutting blade 41 shears the restraining tethers 37 at the loops, thereby detaching the restraining tethers 37 from the rod 39. The second plate 36 could also be configured such that movement to second position pulls the rod 39 out from the restraining tethers 37, or scrapes/pushes the restraining tethers 37 off of the rod 39 or other such pin, thereby releasing the restraining tethers 37 and allowing deeper inflation. In addition, inflation fluid or particulate from the actuator 54 could be routed to the restraining tethers 37 and used to cut the restraining tethers 37 upon actuator 54 actuation.

Since the first and second plates 34, 36 are each movable with respect to the vent 32, four possible venting combinations may be achieved. FIGS. 3A through 6B depict each of the four venting combinations. In general, increased venting through the vent 32 results in a softer, lower pressure deployment of the cushion 16, since inflation fluid leaving the air bag system 14 through the vent 32 is unavailable for inflation of the cushion 16. Conversely, increased blockage of the vent 32 results in a stiffer, higher pressure deployment of the cushion 16. It should be appreciated that the configuration of the openings 38a, 40a, 42a, 42b, 44a within the portions 38, 40, 42, 44 of each plate 34, 36 drastically impacts the amount of venting. While the invention is being described in the context of the openings 38a, 40a, 42a, 42b, 44a as shown in the figures, many different venting combinations are achievable by varying the configuration of the openings.

Figure 3A:
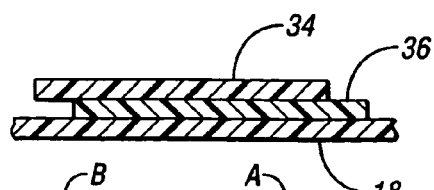
FIG. 3A is a schematic cross-sectional view of a portion of the air bag system of FIG. 2A prior to deployment of a cushion, with the first and second plates in a first position.
Figure 3B:
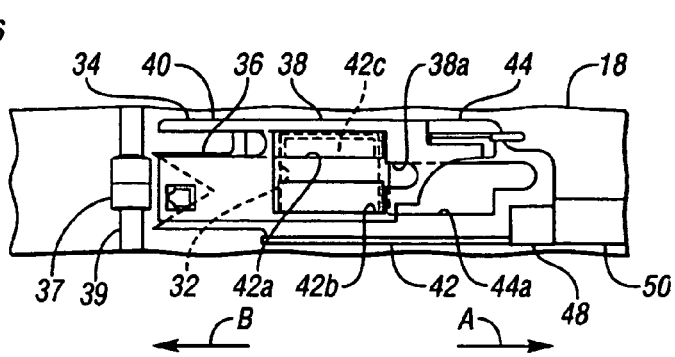
FIG. 3B is a schematic plan view of the portion of the air bag system shown in FIG. 3A.

In FIGS. 3A and 3B, the first plate 34 and the second plate 36 are both in the first position atop the housing 18; that is, the tether 46 has not pulled the first plate 34 to the second position, and the movable member 48 has not been deployed to move to second plate 36 to the second position. As such, the openings 38a, 42a and 42b from the first portions 38, 42 of the first and second plates 34, 36 are aligned atop the vent 32. As seen in FIG. 3B, the vent 32 is approximately two-thirds unblocked in this embodiment, with only the separator 42c of the first portion 42 of the second plate 36 impeding flow therethrough. Thus, if cushion deployment is obstructed prior to the cushion 16 of FIG. 1 passing through predetermined distance P, a relatively large quantity of inflation fluid can pass through the vent 32.

Figure 4A:
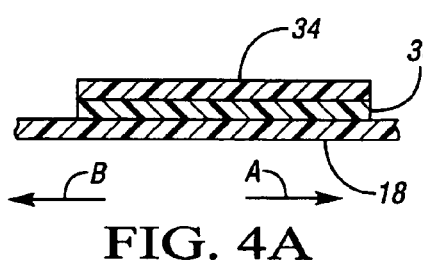
FIG. 4A is a schematic cross-sectional view of a portion of the air bag system of FIG. 2A with the first plate in a second position and the second plate in a first position.
Figure 4B:
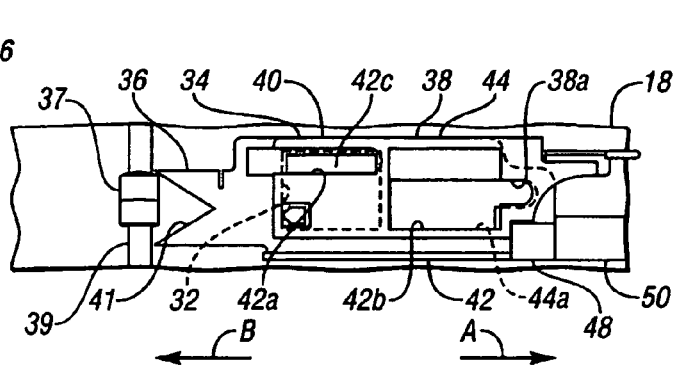
FIG. 4B is a schematic plan view of the portion of the air bag system shown in FIG. 4A.

FIGS. 4A and 4B show the first plate 34 in the second position with the second plate 36 in the first position atop the housing 18, i.e., the cushion 16 of FIG. 1 has expanded beyond the predetermined distance P and the tether 46 has pulled the first plate 34 to the second position. However, the movable member 48 has not been deployed to move the second plate 36 to the second position. As such, the opening 40a from the second portion of the first plate 34 and the openings 42a, 42b from the first portion of the second plate 36 are aligned atop the vent 32. As seen in FIG. 4B, the first plate 34 covers the lower opening 42b in the second plate 36, while the upper openings 40a, 42a of the plates 34, 36 align. Thus, venting can occur through approximately the upper one-third of the vent 32. Thus, if cushion deployment is unobstructed and the cushion fills beyond predetermined distance P, a smaller portion inflation fluid escapes through the vent 32, such that the cushion 16 of FIG. 1 inflates to the first profile 28 shown in FIG. 1 since the restraining tethers 37 remain attached around rod 39.

Figure 5A:
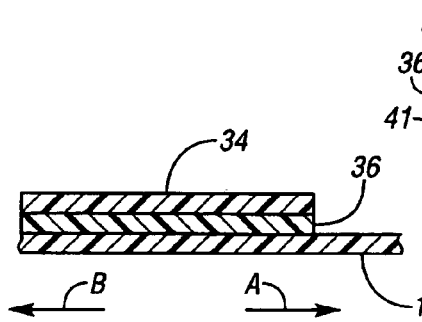
FIG. 5A is a schematic cross-sectional view of a portion of the air bag system of FIG. 2A with the first plate in the first position and the second plate in the second position.
Figure 5B:
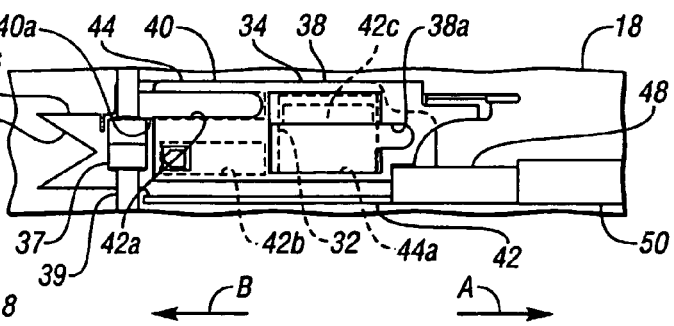
FIG. 5B is a schematic plan view of the portion of the air bag system shown in FIG. 5A.

FIGS. 5A and 5B show the first plate 34 in the first position, with the second plate 36 in the second position atop the housing 18. That is, the movable member 48 has been deployed, but the cushion 16 of FIG. 1 and the attached tether 46 have not passed the predetermined distance P. As such, the openings 38a, 44a are aligned over the vent 32. Opening 38a in the first plate 34 is configured to be approximately the same size of the vent 32, such that the first plate 34 minimally restricts venting. Opening 44a in the second plate 36 leaves approximately the bottom two-thirds of the vent 32 uncovered, thereby allowing venting through approximately two-thirds of the vent 32. Thus, if cushion deployment is obstructed prior to the cushion 16 of FIG. 1 passing through predetermined distance P, a relatively large quantity of inflation fluid can pass through the vent 32.

Figure 6A:
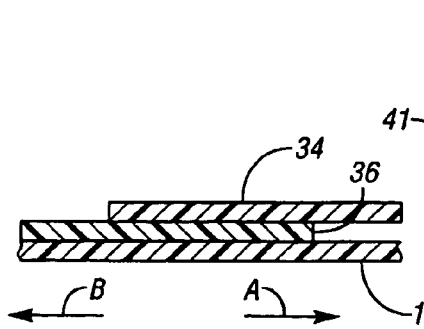
FIG. 6A is a schematic cross-sectional view of a portion of the air bag system of FIG. 2A with the first and second plates in a second position.
Figure 6B:
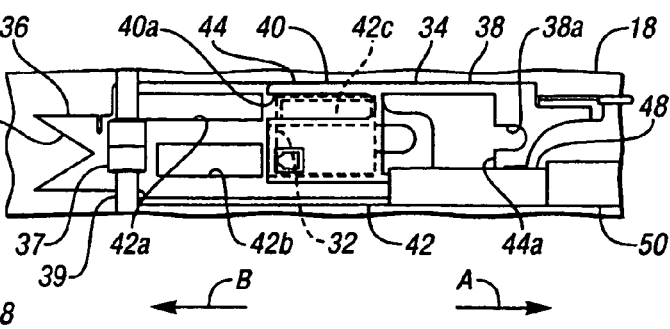
FIG. 6B is a schematic plan view of the portion of the air bag system shown in FIG. 6A.

In FIGS. 6A and 6B, the first and second plates 34, 36 are both in the second position atop the housing 18. That is, the cushion 16 of FIG. 1 has passed the predetermined distance P, thereby allowing the tether 46 to pull the first plate 34 to the second position, and the movable member 48 has been deployed to move the second plate 36 to the second position. As such, the second portions 40, 44 of the plates 34, 36 are aligned atop the vent 32. In this situation, the opening 40a in the first plate 34 leaves approximately the top one-third of the vent 32 uncovered. However, the opening 44a in the second plate 36 leaves only the bottom two-thirds of the vent 32 uncovered. It can thus be seen that when the plates 34, 36 are both in the second position, the vent 32 is effectively blocked; venting through opening 44a is blocked by the first plate 34, and the second plate 36 prevents venting through opening 40a. Thus, this plate configuration allows inflation of the cushion 16 of FIG. 1 to the second profile 30 shown in FIG. 1 since the restraining tethers 37 will be detached by cutting by the second plate 36.

Turning back to FIG. 2A, retention member(s) 35, preferably a pin, extends through the first or second plates 34, 36, such that the retention member(s) 35 initially maintain the first position of each plate 34, 36. Preferably a separate retention member 35 would be used for each plate 34, 36. In this embodiment, the retention member 35 is preferably shearable, such that movement of the plates 34, 36 due to inflation of the cushion 16 of FIG. 1 or actuation of the movable member 48 breaks the retention member(s) 35. Additionally, a travel stop, such as fasteners 33, is preferably included to prevent overtravel of either of the plates 34, 36 as they move to the second position. Finally, a reverse travel feature may be included to prevent the plates 34, 36 from moving back to the first position after movement to the second position occurs. As one example of a reverse travel feature, a flap 43 is shown on the first plate 34 in FIGS. 2A and 2B. Inflation fluid preferably impinges upon the flap 43, with the flap 43 bending and locking the first plate 34 to another portion of the air bag system when the first plate 34 is in the second position. As another example of a reverse travel feature, the movable member 48 may act as a reverse travel feature for the second plate 36, with the movable member 48 prevented from movement following actuation such that the second plate 36 is likewise prevented from movement. Additional structure from the air bag system 14 can also act as a reverse travel feature. For instance, the first plate 34 and/or the second plate 36 could wedge beneath or within adjacent structure, thereby disallowing movement back toward the first position. Teeth may be included on adjacent structure, with the teeth biting into the first plate 34 and/or the second plate 36, or with the teeth mating with corresponding teeth on either or both of the plates 34, 36.

Turning now to FIG. 7, a switch 56, such as an electrical switch, can be used to detect movement of at least one of the plates 34, 36. The switch 56 will be described with respect to the first plate 34, but it should be appreciated that the switch 56 could be used with the second plate 36 in a similar manner. The switch 56 is preferably disposed atop the housing 18, although it could be mounted to another portion of the air bag system without changing the inventive concept. The switch 56 preferably includes a projection 58 extending into the first plate 34 when the first plate 34 is in the first position. As the first plate 34 moves to the second position, the projection 58 breaks or is otherwise mechanically deformed, causing the switch 56 to change from a first state to a second state. It should be noted that the projection 58 need not be included for operation of the switch 56. For instance, the switch 56 may be disposed remote from the first plate 34, with a tether (not shown) operable to actuate the switch 56 upon movement of the first plate 34.

Preferably, wires 60 extend from the switch 56 and communicate with a vehicle controller (not shown). The switch 56 can be used in conjunction with the controller to generate and record various information about movement of the first plate 34, such as the time of movement with respect to deployment of the inflator 20. Note that movement of the first plate 34 from the first position to the second position at least partially blocks the vent 32, as shown in FIGS. 4A and 5A, thereby allowing the cushion 16 to inflate with an increased amount of inflation fluid. Thus movement of the first plate 34, or optionally of any other portion of the air bag system 14 of FIG. 1, can be used to control deployment of other air bag system features. For instance, the switch 56 could be used to disable deployment of a second stage of the inflator 20 if the switch 56 does not change states within a predetermined amount of time after deployment of a first stage of the inflator 20.

Turning now to FIG. 8, a portion of a second embodiment of an air bag system according to the present invention is generally shown at 114. In this embodiment, a fastener 162 rotatably attaches a first plate 134 to a housing 118, with the housing 118 defining a vent 132 through which inflation fluid may flow. The first plate 134 defines a first portion 138 defining an opening 138a, and a second portion 140 defining an opening 140a. The first plate 134 is movable from a first position, wherein the opening 138a in the first portion 138 is substantially aligned with the vent 132, to a second position, wherein the opening 140a in the second portion 140 is substantially aligned with the vent 132. Preferably, the opening 138a in the first portion 138 is approximately the same size as the vent 132, such that the vent 132 is substantially unblocked when the first plate 134 is in the first position. In contrast, the opening 140a in the second portion 140 is smaller than the vent 132, such that the vent 132 is at least partially blocked when the first plate 134 is in the second position. Note that the second portion 140 can be designed so that the vent 132 is completely blocked when the first plate 134 is in the second position.

A tether 146 preferably attaches to the first plate 134 at a projection 164 extending therefrom, with a distal end of the tether 146 preferably attaching to an inner surface of the cushion 16 of FIG. 1. As discussed with respect to the first embodiment of the present invention, the tether 146 preferably detachably attaches to either the cushion 16 or the first plate 134, so as not to affect the inflation profile of the cushion 16. As the cushion 16 inflates, the tether 146 is pulled taut. If the tether 146 passes a predetermined distance P (such as that shown in FIG. 1), the tether 146 pulls the first plate 134 from the first position to the second position. A stop (not shown) is preferably included to prevent the tether 146 from pulling the first plate 134 beyond the second position. It should be noted that while not shown, a second plate can be utilized with this embodiment of the invention to provide additional venting options, such as discussed with respect to the first embodiment above It should also be noted that the first plate 134 rotates from the first position to the second position about the fastener 162. In addition, any second plate can also rotate about the fastener 162 or some other point as it moves from the first position to the second position.

While the first plate 134 is shown substantially round in shape, many configurations are contemplated for the first plate 134 in such a rotatable embodiment. For instance, the first plate 134 may be configured to include a first structure defining the first and second portions 138, 140, with a second structure defining a counterbalancing portion to prevent rotation due to lateral loading upon the first plate 134. That is, the counterbalancing portion would allow rotation of the first plate 134 to occur due to movement of the tether 146, and not due to other forces acting thereupon.

FIGS. 9A and 9B show a portion of a third embodiment of an air bag system according to the present invention at 214. A housing 218 defines a vent 232, with inflation fluid released from an inflator such as the inflator 20 of FIG. 1 passing through the vent 232 to the surrounding atmosphere. Atop the housing 218 are a first plate 234, a second plate 236, and an outer plate 266. The first and second plates 234, 236 are movable from a first position to a second position, as described with respect to other embodiments, to vary the venting area of the vent 232. However, in this embodiment both the first plate 234 and the second plate 236 move in the same direction (toward the upper left) as they move from the first position to the second position. In FIG. 9A, the first and second plates 234, 236 are both in the first position. A movement prevention member 268, preferably a U-shaped pin, extends through the outer plate 266, the second plate 236, and the housing 218, thereby effectively locking the second plate 236 to the housing 218 and preventing movement of the second plate 236 to the second position. In this embodiment, the movement prevention member 268 is preferably not shearable, as with the retention member 35 shown in FIG. 2A. Instead, the movement prevention member 268, by locking the second plate 236 to the housing 218, prevents movement of the second plate 236 when engaged. The first plate 234 includes a tapered protrusion 270. As the first plate 234 moves to the second position, i.e., to the upper left with respect to the housing 218 as shown in FIG. 9A, the tapered protrusion 270 pulls the movement prevention member 268 from at least the housing 218 and the second plate 236. Once the movement prevention member 268 is disengaged, the second plate 236 is free to move to the second position. Thus it can be seen that the movement prevention member 268 prevents movement of the second plate 236 to the second position unless/until the first plate 234 moves to the second position.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. An air bag system comprising:
an inflator operable to release inflation fluid;
an inflatable cushion, said cushion being inflatable upon release of inflation fluid from said inflator;
an air bag housing substantially surrounding said cushion, said housing having a vent for venting inflation fluid released by said inflator;
a first plate including a first portion defining at least a first opening with a nonzero area and a second portion defining at least a second opening with a nonzero area; and
a second plate including a first portion defining at least a first opening and a second portion defining at least a second opening;
wherein said first plate is movable from a first position, wherein said first opening of said first plate is aligned with said vent, to a second position, wherein said second opening of said first plate is aligned with said vent; and
wherein said second plate is movable from a first position in which said first opening of said second plate is aligned with said vent, to a second position in which said second opening of said second plate is aligned with said vent.

2. The air bag system of claim 1, wherein said first opening of said first plate is larger than said second opening of said first plate, such that said first plate blocks more of said vent when in said second position than when in said first position.

3. The air bag system of claim 1, further including a tether operable to move said first plate from said first position to said second position.

4. The air bag system of claim 3, wherein said tether extends between said first plate and said cushion, such that inflation of said cushion beyond a predetermined distance moves said first plate from said first position to said second position.

5. The air bag system of claim 4, wherein said tether detaches from at least one of said first plate and said cushion following movement of said first plate from said first position to said second position.

6. The air bag system of claim 5, further including an anchor strap secured to said tether.

7. The air bag system of claim 1 wherein said first plate has at least one of a retention feature, a travel stop, and a reverse travel feature.

8. The air bag system of claim 1, further including:
a movable member at least partially defining a pressurizable chamber; and an actuator operable to selectively release actuation fluid into said pressurizable chamber, thereby pressurizing said pressurizable chamber to move said movable member from an undeployed state to a deployed state;
wherein said movable member attaches to said second plate, such that movement of the movable member from said undeployed state to said deployed state moves said second plate from said first position of said second plate to said second position of said second plate.

9. The air bag system of claim 1, further including a restraining tether securable to a portion of said air bag system, wherein said restraining tether restricts inflation of said cushion when secured to said portion of said air bag system.

10. The air bag system of claim 9, wherein movement of said second plate from said first position of said second plate to said second position of said second plate releases said restraining tether, thereby allowing inflation of said cushion to a deeper profile than when said restraining tether is secured to said portion of said air bag system.

11. An air bag system, comprising:
an inflator operable to release inflation fluid;
an inflatable cushion, said cushion being inflatable upon release of inflation fluid from said inflator;
an air bag housing substantially surrounding said cushion, said housing having a vent for venting inflation fluid released by said inflator;
a first plate including a first portion defining at least a first opening and a second portion defining at least a second opening; and
a switch changeable from a first state to a second state;
wherein said first plate is movable from a first position, wherein said first opening is aligned with said vent, to a second position, wherein said second opening is aligned with said vent; and
wherein movement of said first plate from said first position to said second position changes said switch from one of said first state and said second state to the other of said first state and said second state.

12. An air bag system, comprising:
an inflator operable to release inflation fluid;
an inflatable cushion, said cushion being inflatable upon release of inflation fluid from said inflator;
an air bag housing substantially surrounding said cushion, said housing having a vent for venting inflation fluid released by said inflator;
a first plate including a first portion defining at least a first opening and a second portion defining at least a second opening;
a second plate including a first portion defining at least a first opening and a second portion defining at least a second opening; and
a movement prevention feature extending through said first plate and said second plate to prevent movement of said second plate prior to movement of said first plate,
wherein said first plate is movable from a first position, wherein said first opening of said first plate is aligned with said vent, to a second position, wherein said second opening of said first plate is aligned with said vent;
wherein said second plate is movable from a first position, wherein said first opening of said second plate is aligned with said vent, to a second position, wherein said second opening of said second plate is aligned with said vent; and
wherein movement of said first plate from said first position of said first plate to said second position of said first plate disengages said movement prevention feature.

13. An air bag system comprising:
an inflator operable to release inflation fluid;
an inflatable cushion, said cushion being inflatable upon release of inflation fluid from said inflator;
an air bag housing substantially surrounding said cushion, said housing having a vent for venting inflation fluid released by said inflator;
a first plate moveable relative to said air bag housing and including a first portion defining at least a first opening with a nonzero area and a second portion defining at least a second opening with a nonzero area, said first plate being movable from a first position wherein said first opening of said first plate is aligned with said vent to a second position wherein said second opening of said first plate is aligned with said vent;
a second plate moveable relative to said air bag housing and including a first portion defining at least a first opening with a nonzero area and a second portion defining at least a second opening with a nonzero area, said second plate being movable from a first position wherein said first opening of said second plate is aligned with said vent to a second position wherein said second opening of said second plate is aligned with said vent; wherein said first plate and said second plate interact to define at least four distinct vent areas.

14. The air bag system of claim 13, further including a tether operable to move said first plate from said first position of said first plate to said second position of said first plate.

15. The air bag system of claim 14, wherein said tether extends between one of said first and second plates and said cushion, said tether operable to move said one of said first and second plates from said first position of one of said first plate and said second plate to said second position of one of said first plate and said second plate.

16. The air bag system of claim 15, wherein said tether detaches from at least one of said one of said first and second plates and said cushion following movement of said one of said first and second plates from said first position of one of said first plate and said second plate to said second position of one of said first plate and said second plate.

17. The air bag system of claim 13, further comprising:
a movable member at least partially defining a pressurizable chamber; and
an actuator operable to selectively release actuation fluid into said pressurizable chamber, thereby pressurizing said pressurizable chamber to move said movable member from an undeployed state to a deployed state;
wherein said movable member attaches to said second plate, such that movement of the movable member from said undeployed state to said deployed state moves said second plate from said first position of said second plate to said second position of said second plate.

* * * * *